(12) United States Patent
Kocourek

(10) Patent No.: US 9,458,946 B2
(45) Date of Patent: Oct. 4, 2016

(54) VALVE CARTRIDGE FOR AN ADJUSTABLE VALVE, AND ASSOCIATED SOLENOID VALVE

(71) Applicant: Robert Bosch GmbH, Stuttgart (DE)

(72) Inventor: Vaclav Kocourek, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 346 days.

(21) Appl. No.: 13/870,016

(22) Filed: Apr. 25, 2013

(65) Prior Publication Data
US 2013/0284955 A1 Oct. 31, 2013

(30) Foreign Application Priority Data
Apr. 25, 2012 (DE) .................. 10 2012 206 791

(51) Int. Cl.
*F16K 31/08* (2006.01)
*B60T 8/36* (2006.01)

(52) U.S. Cl.
CPC .............. *F16K 31/082* (2013.01); *B60T 8/36* (2013.01); *B60T 8/363* (2013.01)

(58) Field of Classification Search
CPC .... F16K 31/08; F16K 31/082; F16K 31/084; B60T 8/36; B60T 8/363
USPC ................. 251/64–65, 129.15; 335/229, 277
See application file for complete search history.

(56) References Cited

U.S. PATENT DOCUMENTS

| | | | | |
|---|---|---|---|---|
| 5,727,769 A * | 3/1998 | Suzuki | ..................... | 251/129.15 |
| 6,199,587 B1 * | 3/2001 | Shlomi | ................. | F16K 31/082 |
| | | | | 137/625.5 |
| 2001/0019117 A1 * | 9/2001 | Schoeb | .......................... | 251/65 |
| 2004/0036048 A1 * | 2/2004 | Petersen | ................. | 251/129.15 |

FOREIGN PATENT DOCUMENTS

DE   10 2007 053 134 A1   5/2009

* cited by examiner

*Primary Examiner* — Marina Tietjen
(74) *Attorney, Agent, or Firm* — Maginot, Moore & Beck LLP

(57) ABSTRACT

A valve cartridge has a capsule and a valve insert, which is connected to the capsule by way of a first end and has a valve body with a main valve seat at the other end. A plunger is movably guided within the valve cartridge, it being possible for the plunger to move against the force of a return spring and the plunger having a closing element with a sealing element that interacts with the main valve seat of the valve body in a sealing manner to provide a sealing function. A corresponding solenoid valve has a valve cartridge of this kind. A magnetic damping assembly has a permanent magnet and an electrical conductor which is arranged in the magnetic field of the permanent magnet and is coupled to the moving plunger and can be moved substantially perpendicular to the magnetic field.

12 Claims, 1 Drawing Sheet

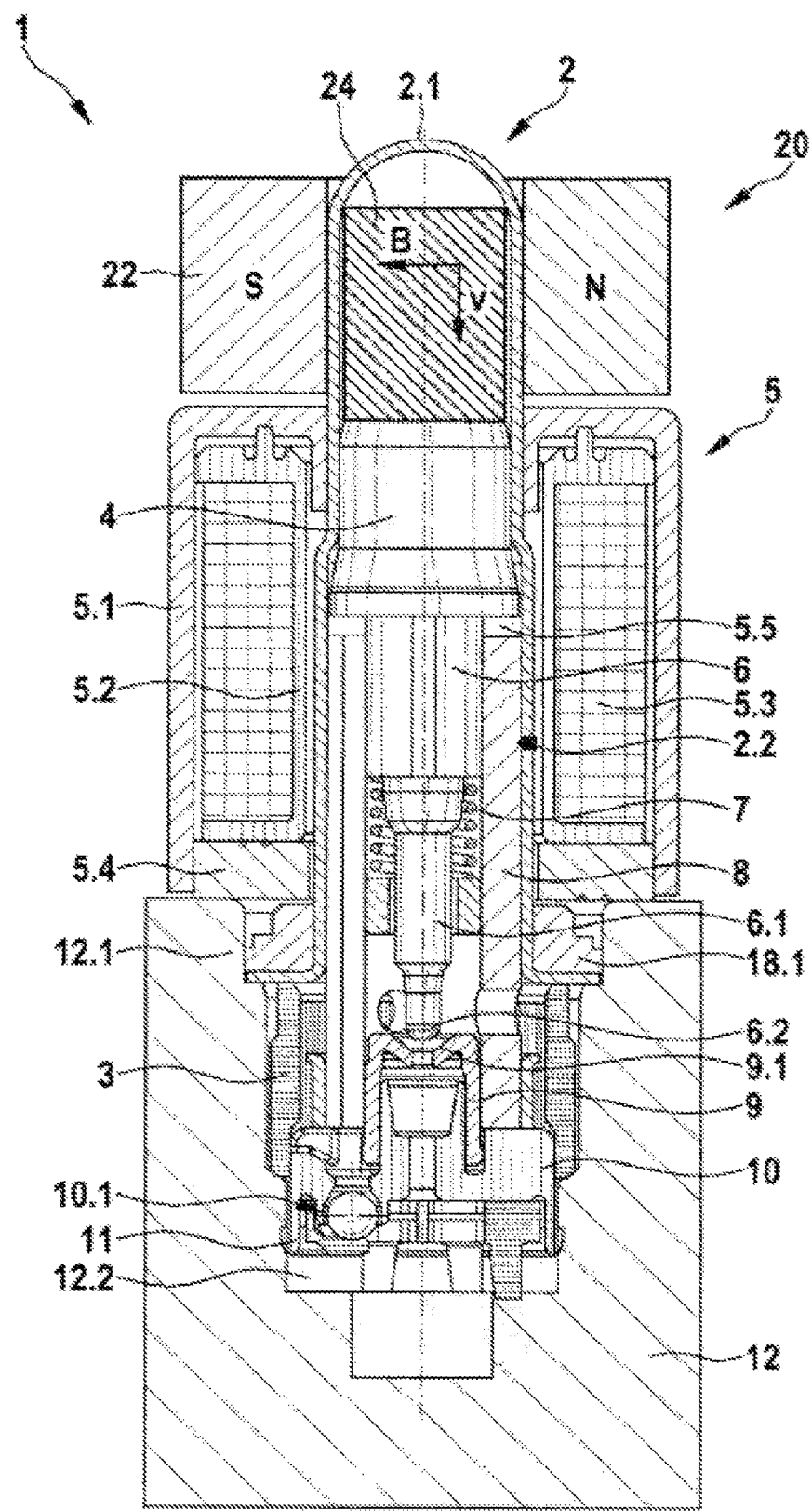

VALVE CARTRIDGE FOR AN ADJUSTABLE VALVE, AND ASSOCIATED SOLENOID VALVE

This application claims priority under 35 U.S.C. §119 to patent application no. DE 10 2012 206 791.4, filed on Apr. 25, 2012 in Germany, the disclosure of which is incorporated herein by reference in its entirety.

BACKGROUND

The disclosure relates to a valve cartridge for an adjustable valve, and to an associated solenoid valve.

Adjustable solenoid valves are increasingly being used for controlling the braking force in hydraulic brake systems. The particular requirement of these valves as compared to the switching valves is that they have to keep the partial stroke stable over a relatively long period of time. No electrical, hydraulic or mechanical interference, which moves the valve out of the equilibrium position, must be amplified by the valve. Amplification of the interference leads to oscillations which cause a fluctuation in pressure, noise and a reduction in stability. In modern brake systems, the adjustable valve is stabilized by hydraulic damping. Movement of the valve causes fluid to be interchanged between two chambers which are separated by a connection/line. Some of the energy is converted into heat in the line due to dissipation effects, this leading to stabilization of the valve. The amount of energy discharged from the system depends on the geometry of the connection.

The effect of the hydraulic damping elements depends on the viscosity of the fluid as well as on the geometry of the connection. Since the ambient temperature changes during operation, the viscosity of the liquid also changes. Damping can therefore vary up to a factor of 1000. Furthermore, air bubbles in the liquid influence the viscosity. The damping effect can therefore fluctuate in a stochastic manner. In order to achieve a reproducible valve reaction, the armature space has to be carefully ventilated. The opposing properties of an armature space which can be easily ventilated and the desired high level of damping make it particularly difficult to design the valve with hydraulic damping elements.

Laid-open specification DE 10 2007 053 134 A1 describes a valve cartridge for a solenoid valve, and an associated solenoid valve. The described valve cartridge for a solenoid valve comprises a capsule, a magnet armature which is movably guided within the capsule, a valve insert which is inserted into the capsule by way of a first end, and a valve body having a main valve seat. A plunger is guided in a longitudinally movable manner within the valve insert, the said plunger having a closing element with a sealing element which enters the main valve seat of the valve body in a sealing manner in order to provide a sealing function. The plunger can be moved against the force of a return spring within the valve insert by the magnet armature, wherein the magnet armature is moved by a magnetic force which is generated by a magnet assembly. In order to generate a magnetic flux, the magnet assembly comprises a housing casing, a winding support, a coil winding and a covering disk and is pressed, for example, onto the capsule of the valve cartridge.

SUMMARY

The valve cartridge according to the disclosure has the advantage over the above that the valve movements which are caused by interference can be damped and the valve can be stabilized with the aid of the magnetic field of the permanent magnet. Damping of the magnetic damping assembly depends on the electrical conductivity and the volume of the moving electrical conductor and the magnetic flux density. In comparison to hydraulic damping, magnetic damping can be considered to be independent of temperature since only the electrical conductivity in the relevant region is influenced very weakly by the temperature.

The essence of the disclosure is to couple a component which is composed of an electrically conductive material to the driven constituent parts, for example an armature and/or plunger, of the valve cartridge and to move the said component perpendicular to a magnetic field which is generated by the permanent magnet. In this case, a current is induced in the electrically conductive component, the said current reacting with the magnetic field and generating a Lorentz force which acts against the movement of the electrically conductive component. In contrast to hydraulic damping elements, the force advantageously does not depend on the temperature and the viscosity of the fluid. On account of the lack of dependence on temperature and viscosity, the damping effect can be set more precisely and the ability to ventilate an armature space of the valve cartridge well advantageously does not have to be ensured.

Embodiments of the present disclosure provide a valve cartridge having a capsule and a valve insert which is connected to the capsule by way of a first end and has a valve body with a main valve seat at the other end. A plunger is movably guided within the valve cartridge, it being possible for the said plunger to be moved against the force of a return spring and the said plunger having a closing element with a sealing element which interacts with the main valve seat of the valve body in a sealing manner in order to provide a sealing function. A magnetic damping assembly is provided according to the disclosure, the said magnetic damping assembly having a permanent magnet and an electrical conductor which is arranged in the magnetic field of the permanent magnet and is coupled to the moving plunger and can be moved substantially perpendicular to the magnetic field.

Embodiments of the valve cartridge according to the disclosure can preferably be used in a solenoid valve which comprises an electrical magnet assembly in addition to the valve cartridge according to the disclosure. A magnet armature is movably guided within the valve cartridge, it being possible for the said magnet armature to be moved against the force of a return spring by a magnetic force which is generated by the electrical magnet assembly and the said magnet armature moving the plunger which is guided within the valve insert. Embodiments of the valve cartridge according to the disclosure can be used, in principle, for all solenoid valves which are open in the currentless state and all solenoid valves which are closed in the currentless state.

It is particularly advantageous that the permanent magnet can be arranged outside the capsule. The permanent magnet can preferably be designed as a ring magnet. The permanent magnet can therefore be mounted in a simple manner, it preferably being possible for the said permanent magnet to be plug-mounted onto the capsule of the valve cartridge by way of the opening.

In an advantageous refinement of the valve cartridge according to the disclosure, the electrical conductor can be designed as a copper component or an aluminum component. The electrical conductor can preferably be designed as a cylinder, as a result of which simple and cost-effective mass production is possible.

In a further advantageous refinement of the valve cartridge according to the disclosure, the electrical conductor can be guided within the capsule such that the electrical conductor is arranged within the opening in the permanent magnet which is designed as a ring magnet.

In an advantageous refinement of the solenoid valve according to the disclosure, the permanent magnet which is designed as a ring magnet can be arranged, for example, above the electrical magnet assembly.

In an advantageous refinement of the solenoid valve according to the disclosure, the electrical conductor can be fixedly connected to the magnet armature and, as a result, advantageously damp a movement of the magnet armature and of the plunger which is connected to the magnet armature, which movement is caused by interference. The magnet armature with the electrical conductor can be guided within the capsule such that the electrical conductor is arranged within the opening in the permanent magnet which is designed as a ring magnet.

BRIEF DESCRIPTION OF THE DRAWING

An exemplary embodiment of the disclosure is illustrated in the drawing and will be explained in greater detail in the following description. In the drawing, identical reference symbols denote components or elements which execute the same or analogous functions.

The single FIGURE shows a schematic sectional illustration of a solenoid valve with an exemplary embodiment of a valve cartridge according to the disclosure.

DETAILED DESCRIPTION

As shown in the single FIGURE, an exemplary embodiment of a valve cartridge 2 according to the disclosure comprises a capsule 2.1, which is preferably produced as a deep-drawn steel part, and a valve insert 8 which is inserted into the capsule 2.1 by way of a first end and accommodates a valve body 9 with a main valve seat 9.1 at the other end. A plunger 6 is movably guided within the valve cartridge 2, it being possible to move the said plunger against the force of a return spring 7 and the said plunger having a closing element 6.1 with a sealing element 6.2 which enters the main valve seat 9.1 of the valve body 9 in a sealing manner in order to provide a sealing function. A magnetic damping assembly 20 is provided according to the disclosure, the said magnetic damping assembly having a permanent magnet 22 and an electrical conductor 24 which is arranged in the magnetic field B of the permanent magnet 22 and is coupled to the moving plunger 6 and can be moved substantially perpendicular to the magnetic field B. In this case, the magnetic field B of the permanent magnet 22 induces a current in the electrical conductor 24 in the event of a movement v of the electrical conductor 24, the said current causing a damping force $F_L$ which counteracts the movement of the electrical conductor 24 with the plunger 6.

The effect of the magnetic field B on a moving electrically conductive body 24 is generally known. If the electrical conductor 24 moves perpendicular to a homogeneous magnetic field B, the effect can be simply illustrated by the following equations. The relationship according to the following equation (1)

$$f_L = J*B \quad (1)$$

holds true for a Lorentz force which brakes the movement. In the said equation, $f_L$ denotes the force density, J denotes the current density of the current which is induced by the movement, and B denotes the magnetic flux density.

The current density J can be determined by equation (2).

$$J = \gamma * v * B \quad (2)$$

where $\gamma$ denotes the electrical conductivity and v denotes the speed of the electrical conductor 24.

Multiplying by the volume of the electrical conductor 24 gives an equation (3) for the absolute force $F_L$ which counteracts the movement of the electrical conductor 24.

$$F_L = \gamma * v * B^2 * V \quad (3)$$

In order to be able to compare the effect of the magnetic field B described here with the effect of hydraulic damping elements, equation (3) for the Lorentz force $F_L$ is accordingly rewritten. Damping d in Ns/m is described by equation (4) in terms of hydraulics.

$$d = F/v \quad (4)$$

Setting the Lorentz force $F_L$ according to equation (3) as the force F gives equation (5) for the damping effect of the magnetic field B.

$$d = \gamma * B^2 * V \quad (5)$$

The damping d of the magnetic damping assembly depends on the electrical conductivity $\gamma$ and the volume V of the moving conductor 24 and the magnetic flux density B. In comparison to hydraulic damping d, magnetic damping can be considered to be independent of temperature because only the electrical conductivity $\gamma$ in the relevant region is influenced very weakly by the temperature.

As further shown in the FIGURE, the illustrated solenoid valve 1 comprises an electrical magnet assembly 5 in addition to the valve cartridge 2 according to the disclosure. In order to generate a magnetic flux, the electrical magnet assembly 5 comprises a housing casing 5.1, a winding support 5.2, a coil winding 5.3 and a covering disk 5.4. A magnet armature 4 is movably guided within the valve cartridge 2, it being possible to move the said magnet armature against the force of the return spring 7 by a magnetic force which is generated by the electrical magnet assembly 5 and the said magnet armature moving the plunger 6 which is guided within the valve insert 8. The magnet assembly 5 generates the magnetic force by virtue of current being applied to the coil winding 5.3 by means of electrical connections (not shown), the said magnetic force moving the longitudinally movable magnet armature 4 with the plunger 6, which comprises a closing element 6.1 with a main sealing element 6.2, toward the valve insert 8 against the force of the return spring 7, wherein the plunger 6 and the return spring 7 are guided in an inner bore in the valve insert 8. In order to provide a sealing function, the sealing element 6.2 of the closing element 6.1 enters the main valve seat 9.1 of the valve body 9 in a sealing manner. The valve insert 8 conducts the magnetic flux, which is introduced by the magnet assembly 5 by means of the covering disk 5.4, axially across an air gap 5.5 in the direction of the magnet armature 4. In the illustrated exemplary embodiment, the permanent magnet 22 is designed as a ring magnet and is arranged above the electrical magnet assembly 5. The permanent magnet 22 which is designed as a ring magnet can be plug-mounted, for example, onto the capsule 2.1. In the illustrated exemplary embodiment, the electrical conductor 24 is designed as a copper cylinder. As an alternative, the electrical conductor 24 can also be produced as an aluminum component or from a different material which is highly electrically conductive. The electrical conductor 24 is guided within the capsule 2.1 such that the electrical conductor 24 is arranged within the opening in the permanent magnet 22 which is designed as a ring magnet and therefore in the magnetic field B of the permanent magnet 22.

If a current flows through the coil winding 5.3, a magnetic force is generated in the magnet armature 4. If the magnetic force in the illustrated solenoid valve 1 which is open in the currentless state is greater than the opening forces, the magnet armature 4 and the plunger 6 with the closing element 6.1 and the sealing element 6.2 begin to move in the axial direction. The basic idea of the disclosure is to fasten the electrical conductor 24, which is designed as a cylinder composed of copper and follows the axial movement of the armature, to the magnet armature 4. Since the permanent magnet 22 which is designed as a ring magnet and is polarized perpendicular to the axial movement of the electrical conductor 24, that is to say from right to left in the illustrated exemplary embodiment, is fastened above the electrical magnet assembly 5, the electrical conductor 24 which is designed as a copper cylinder is situated in a magnetic field B which is directed perpendicular to the movement v. The movement v induces a Lorentz force in the electrical conductor 24, the said Lorentz force damping the movement v. The valve movements which are caused by interference can be damped and the valve can be stabilized in an advantageous manner with the aid of the magnetic field B of the permanent magnet 22. The damping force advantageously does not depend on the temperature and the viscosity of the fluid. On account of the lack of dependence on temperature and viscosity, the damping effect can be set more precisely. In addition, the ability to ventilate the armature space in the valve cartridge 2 well is advantageously not required.

During production of the solenoid valve 1, the capsule 2.1 and the valve insert 8 of the valve cartridge 2 are joined by being pressed together, and the valve cartridge 2 is hydraulically sealed off from the atmosphere by a sealing weld 2.2. In addition, a non-return valve 10.1 is provided on a valve lower part 10, and also a ring filter 3 and flat filter 11 for filtering particles of dirt are provided in the illustrated solenoid valve 1. The solenoid valve 1 is caulked by means of a caulking bush 18.1 on a caulking region 12.1 with a fluid block 12 in the illustrated exemplary embodiment, wherein the valve lower part 10 is held by a corresponding holding bore 12.2 in the fluid block 12.

What is claimed is:

1. A valve cartridge comprising:
 a capsule having a first end;
 a valve insert inserted into the capsule at the first end and including a valve body with a main valve seat;
 a plunger movably guided for axial movement within the capsule toward the valve seat, said plunger being configured to be moved against a force of a return spring and having a closing element with a sealing element; and
 a magnetic damping assembly,
 wherein the sealing element interacts with the main valve seat of the valve body in a sealing manner to provide a sealing function,
 wherein the magnetic damping assembly has (i) a permanent magnet positioned outside the capsule and configured to generate a magnetic field and (ii) an electrical conductor positioned in the capsule in the magnetic field of the permanent magnet, the electrical conductor being coupled to the plunger for axial movement therewith within the capsule, the permanent magnet being configured to generate the magnetic field such that the magnetic field in which the electrical conductor is positioned is perpendicular to the axial movement of the electrical conductor in the capsule.

2. The valve cartridge according to claim 1, wherein the current reacts with the magnetic field such that a Lorentz force is generated which acts against the movement of the electrical conductor and the plunger.

3. The valve cartridge according to claim 1, wherein the permanent magnet includes a ring magnet.

4. The valve cartridge according to claim 1, wherein the electrical conductor includes one of a copper component and an aluminum component.

5. The valve cartridge according to claim 1, wherein the electrical conductor is designed as a cylinder.

6. The valve cartridge according to claim 3, wherein the electrical conductor is guided within the capsule such that the electrical conductor is positioned within an opening in the ring magnet.

7. A solenoid valve comprising:
 an electrical magnet assembly; and
 a valve cartridge including (i) a capsule having a first end, (ii) a valve insert inserted into the capsule at the first end and including a valve body with a main valve seat, (iii) a magnet armature positioned in the capsule and configured to be moved axially in the capsule by a magnetic force generated by the electrical magnet assembly, (iv) a plunger in the capsule coupled to the armature and movable by the armature, the plunger having a closing element with a sealing function, and (v) a magnetic damping assembly,
 wherein the magnet armature is movably guided within the valve cartridge and configured to be moved against a force of a return spring by the magnetic force generated by the electrical magnet assembly,
 wherein the sealing element interacts with the main valve seat of the valve body in a sealing manner to provide a sealing function,
 wherein the magnetic damping assembly includes (i) a permanent magnet positioned outside the capsule and configured to generate a magnetic field and (ii) an electrical conductor positioned in the capsule in the magnetic field of the permanent magnet, the electrical conductor being coupled to the armature for axial movement therewith within the capsule, the permanent magnet being configured to generate the magnetic field such that the magnetic field is directed perpendicular to the axial movement of the electrical conductor.

8. The solenoid valve according to claim 7, wherein the permanent magnet includes a ring magnet positioned above the electrical magnet assembly.

9. The solenoid valve according to claim 7, wherein the electrical conductor is fixedly connected to the magnet armature.

10. The solenoid valve according to claim 8, wherein the magnet armature and electrical conductor are guided within the capsule such that the electrical conductor is positioned within an opening in the ring magnet.

11. The solenoid valve of claim 7, wherein movement of the electrical conductor within the capsule perpendicular to the magnetic field induces a current in the electrical conductor, the current reacting with the magnetic field and generating a Lorentz force which acts against the axial movement of the electrical conductor and the plunger.

12. A solenoid valve comprising:
 a valve cartridge including (i) a capsule having a first end, (ii) a valve insert inserted into the capsule at the first end and including a valve body with a main valve seat, (iii) a magnet armature positioned in the capsule and movable within the capsule along a movement axis, and (iv) a plunger in the capsule coupled to the armature and movable with the armature along the movement axis, the plunger having a closing element with a sealing function;

a first magnetic assembly comprising an electrical magnet actuator assembly configured to generate a magnetic force that moves the magnet armature along the movement axis within the capsule; and a second magnetic assembly comprising a magnetic damping assembly configured to generate a magnetic field that is directed perpendicularly with respect to the movement axis and that counteracts the axial movement of the magnet armature and the plunger, wherein the second magnetic assembly includes a permanent magnet located exterior to the capsule, the permanent magnet having a first pole and a second pole arranged on opposite sides of the capsule such that the permanent magnet is polarized perpendicular to the movement axis.

* * * * *